(No Model.)
W. MOLESWORTH.
SYRINGE.
No. 319,296. Patented June 2, 1885.
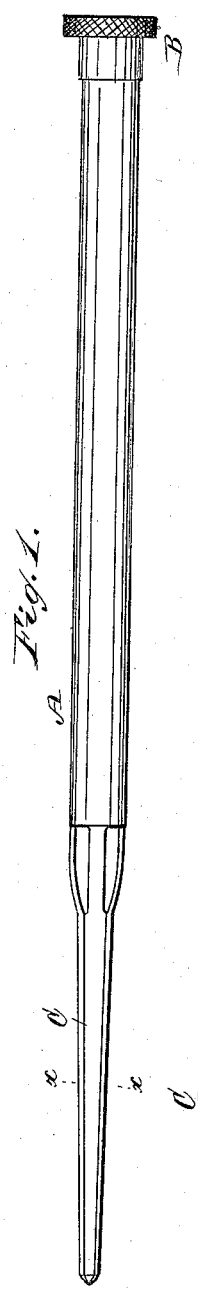
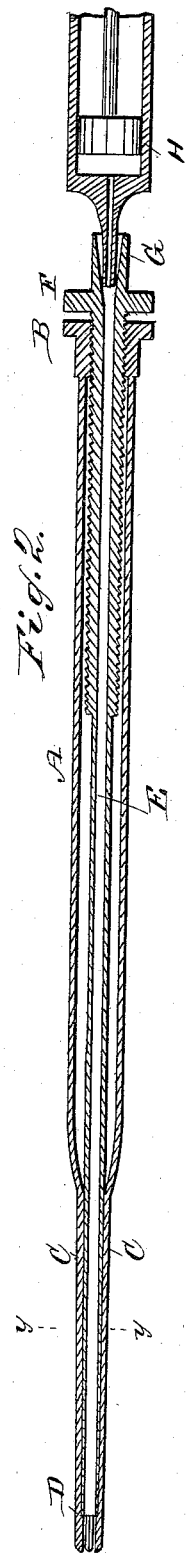
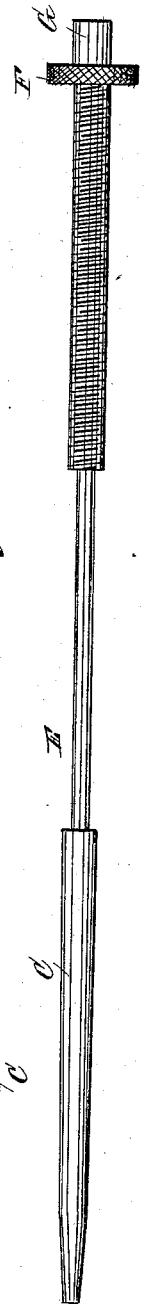
WITNESSES:
Theo. G. Hoster
C. Sedgwick
INVENTOR:
W. Molesworth
BY
ATTORNEYS.

UNITED STATES PATENT OFFICE.

WILLIAM MOLESWORTH, OF BROOKLYN, NEW YORK.

SYRINGE.

SPECIFICATION forming part of Letters Patent No. 319,296, dated June 2, 1885.

Application filed August 2, 1884. (No model.)

*To all whom it may concern:*

Be it known that I, WILLIAM MOLESWORTH, of Brooklyn, in the county of Kings and State of New York, have invented a new and Improved Dilator, Drainer, Injection and Suction Syringe Tube, of which the following is a full, clear, and exact description.

The object of my invention is to provide a new and improved dilator for dilating wounds, the female urethra, uterus, &c., and which dilator can also be used as a drainer for draining and washing wounds, &c., and as an injection and suction syringe tube.

The invention consists in the combination, with a tube having prongs at one end and a head at the other, of a tapered tube adapted to be screwed into the pronged end, provided at one end with a head, and a neck projecting from the head.

Reference is to be had to the accompanying drawings, forming part of this specification, in which similar letters of reference indicate corresponding parts in all the figures.

Figure 1 is a longitudinal elevation of my improved dilator, drainer, injection and suction syringe tube. Fig. 2 is a longitudinal sectional elevation of the same, a dilating-tube being inverted. Fig. 3 is an enlarged cross-sectional view on the line $x$ $x$, Fig. 1. Fig. 4 is an enlarged cross-sectional view on the line $y$ $y$, Fig. 2. Fig. 5 is a longitudinal elevation of one of the dilating-tubes.

A metal tube, A, has a milled head or flange, B, at one end, and the other end is tapered and slitted longitudinally to form a series of spring prongs, C, preferably four, which are pressed firmly together by the spring-tension in the said prongs.

The tapered end of the tube A must have a very small diameter, so that it can easily be inserted into wounds, &c., and the prongs must fit well against each other to form a perfectly smooth and uniform exterior surface.

At the free ends of the prongs C shoulders D are formed on the inner surfaces.

The tube A is internally screw-threaded at the headed end.

The dilating-tubes E have a milled head, F, at one end, and are tapered toward the opposite end, the tapered end being of greater diameter than the inner diameter of the tube A at the shoulders D. The tubes E are screw-threaded externally from the heads to about one-third the length of the tubes, and are adapted to be secured into the threaded part of the tube A.

On the head F of each tube E a neck, G, is formed, which is in communication with the bore of the tube E.

Tubes having tapered parts of different diameters are provided for separating the ends of the prongs C more or less.

In using the instrument the point formed by the free ends of the prongs, which are pressed closely together, is inserted in the wound, &c., and then one of the dilating-tubes E is passed and screwed into the tube A, the tapered part of the tube E pressing the points of the prongs C from each other, and thus dilating or widening the wound. Accordingly as a tube E of greater or less diameter is used the wound, &c, can be dilated more or less.

The tubes E can be screwed onto the tube A until their ends rest against the shoulder D.

When the wound, &c., is dilated, pus and other matter or fluids can be drawn off through the tubes E. Liquids can be injected by means of a syringe, H, and the wound, &c., can be washed and the water drawn off.

The milled head A on the tube serves to hold it, and the milled heads on the tubes E serve to hold them while turning them.

Having thus described my invention, I claim as new and desire to secure by Letters Patent—

1. In a dilator, the combination, with a tube having tapered spring-prongs at one end, of a tube adapted to be screwed into the pronged tube and having a tapered end for separating the prongs, substantially as herein shown and described.

2. In a dilator, the combination, with a tube having tapered prongs, of a tube adapted to be screwed into the pronged tube and provided at one end with a tapered part and at the opposite end with a neck, substantially as herein shown and described.

3. In a dilator, the combination, with the tube A, having tapered prongs C, provided with shoulders D, of the tapered tube E, having a head, F, and a neck, G, substantially as herein shown and described.

WILLIAM MOLESWORTH.

Witnesses:
 OSCAR F. GUNZ,
 C. SEDGWICK.